United States Patent [19]

Smith, Jr. et al.

[11] 4,280,807
[45] Jul. 28, 1981

[54] AUTOCLAVE FURNACE WITH COOLING SYSTEM

[75] Inventors: Charles W. Smith, Jr., Fairview; Franz X. Zimmerman, Erie, both of Pa.; William H. Walker, Spring, Tex.

[73] Assignee: Autoclave Engineers, Inc., Erie, Pa.

[21] Appl. No.: 163,434

[22] Filed: Jun. 27, 1980

Related U.S. Application Data

[62] Division of Ser. No. 967,240, Dec. 7, 1978, Pat. No. 4,246,957.

[51] Int. Cl.³ .............................................. F27B 5/04
[52] U.S. Cl. ................................... 432/205; 13/31 R; 266/254
[58] Field of Search ........................... 432/205; 13/31; 266/254

[56] References Cited

U.S. PATENT DOCUMENTS 3,002,735  10/1961  Baker et al. ......................... 432/205
4,151,400  4/1979  Smith et al. ........................ 13/31 R

*Primary Examiner*—John J. Camby
*Attorney, Agent, or Firm*—Webb, Burden, Robinson & Webb

[57] ABSTRACT

An apparatus or system for cooling the interior of an autoclave furnace vessel after it has been pressurized with a gas and heated. The system comprises a heat conducting conduit opening at one end to the furnace interior and at the other end to a shut-off valve exterior to the vessel. Intermediate the two ends of the conduit is a coil portion comprising a heat exchanger positioned at a location in the furnace where hot vessel gases may be forced through or past the coil. Furnace gases are forced into the conduit and therefore through the coiled portion where they are heated prior to being exhausted. According to a preferred embodiment of this invention, there is a Joule-Thomson valve before the coiled portion of the conduit to reduce the temperature of the exhausting gases prior to arriving at the coiled portion.

1 Claim, 3 Drawing Figures

AUTOCLAVE FURNACE WITH COOLING SYSTEM

This application is a division of application Ser. No. 967,240, filed Dec. 7, 1978, now U.S. Pat. No. 4,246,957.

BACKGROUND

There currently exist numerous uses for apparatus that treat a specimen or workpiece at high pressures and high temperature including, for example, gas pressure bonding furnaces and hot isostatic pressing apparatus. In these apparatus, it is typical to treat a workpiece at 1000° C. and 15,000 psi although these are not the maximum temperature and pressure conditions encountered. Suitable apparatus for these applications generally comprise a furnace within a pressure vessel or autoclave. The furnace provides the heat to the workpiece and protects the vessel from excessive temperature. The vessel maintains the furnace and the workpiece at the desired pressures.

In most processes, it is essential that the temperature of the workpiece be extremely uniform. Otherwise, problems may result from differential thermal expansion of the workpiece. Thus, the furnace portion of the high pressure-high temperature apparatus must distribute the heat evenly to the workpiece. There exist a number of applications of high temperature-high pressure vessels as described herein, where it is desirable to cool the workpiece within the workspace as fast as possible after treatment is completed. For example, certain metallic alloys after being heat treated in the vessel will have a finer grain size if more rapidly cooled from any 1250° C. to 750° C. This will improve the performance of the alloys in certain applications. More rapid cooling is also desirable for increasing the turn around of the vessel, i.e., the number of heating and cooling cycles in a given period of time. Until now, there have been two suggested approaches to more rapid cooling of high temperature-high pressure vessels. The circulation of the pressurized gases within the vessel is promoted and/or hot pressurized gases are with the aid of a pump withdrawn from the vessel, cooled in a heat exchanger and returned to the vessel. These basic concepts are dealt with in our U.S. Pat. No. 4,022,446. It has also been suggested to circulate cooling liquids to a heat exchanger within the pressure vessel and mechanically circulate the atmosphere within the vessel as shown in U.S. Pat. No. 3,168,607.

Applicants have now developed techniques for promoting rapid cooling of the pressurized furnace making use of the transfer of the mass of pressurized gases within the vessel to the exterior of the vessel as required for depressurizing the vessel. In a preferred embodiment, the Joule-Thomson effect is utilized to increase the effectiveness of the heat transferred from the vessel by the escaping gases.

The Joule-Thomson effect is a phenomenon resulting in a difference in temperature between compressed and released gas passing at high pressure through a porous plug or small aperture referred to herein as a Joule-Thomson valve. The equations describing this effect contain two partial derivatives:

$$\left(\frac{\partial T}{\partial P}\right)_H = \frac{T\left(\frac{\partial V}{\partial T}\right)_P - V}{C_P}$$

The expression on the left is the rate of change of temperature with pressure at constant heat content. The expression on the right has in its numerator the difference between the product of the temperature and the rate of change of volume with temperature at constant pressure, from which the volume is subtracted. The denominator contains the molar specific heat at constant pressure. The term on the left of the equality sign is called the Joule-Thomson Coefficient. It varies with the temperature and pressure of the gas, passing from positive values through zero to negative values. The temperature at which it is zero is called the Joule-Thomson Inversion Temperature (hereafter the inversion temperature) and varies with the particular gas. For a van der Waals gas, the equation becomes:

$$\left(\frac{dT}{dP}\right)_h = \frac{1}{c_p}\left(\frac{2a}{RT} - b\right)$$

The term in parentheses on the right side in the preceding equation can be positive or negative. It is apparent that the inversion temperature at which the sign of $dT/dp$ changes is that for which $2a/RT_i = b$ or $T_i = -2a/bR$.

SUMMARY OF THE INVENTION

Briefly, according to this invention, there is provided an apparatus for gas pressure bonding, hot isostatic pressing or the like in which a workpiece may be treated at elevated temperatures and pressures. The apparatus comprises an elongate cylindrical pressure vessel. The pressure vessel further comprises an inner insulated hood for enclosing the workpiece and a hearth upon which the workpiece rests. An electrical heating element is provided within the space enclosed by the insulated hood. A coiled conduit is arranged within the space enclosed by the hood. Preferably, mechanical apparatus such as a fan are arranged to force or circulate the pressurized medium within the hood past the coiled conduit. A conduit extension in communication with one end of the coil passes through the pressure vessel and either exhausts through a valve to the atmosphere or to a reservoir. A second conduit extension in communication wth the other end of the coil is arranged to conduct the pressurized atmosphere to the coil. The coil comprises a heat exchanger. The location of the inlet to the conduit may vary but in preferred embodiments is arranged to intake the coolest available gases within the pressure vessel.

Where the Joule-Thomson effect is to be utilized, there must be located between the intake and before the coil, a Joule-Thomson valve which may simply comprise an appropriate orifice. In this embodiment, the intake to the conduit must be located where the gas in the vessel is below the inversion temperature as explained herein or a preliminary heat exchanger for cooling the gas must be provided between the intake and the Joule-Thomson valve.

According to another embodiment, the intake to the conduit is in the warmest part of the vessel and a heat exchanger is provided external to the vessel between the intake and the Joule-Thomson valve. In yet another embodiment, the heat exchanger between the intake located in a hot portion of the vessel and the Joule-Thomson valve and/or the coiled portion of the conduit is located within the vessel and comprises another coiled portion abutting the interior of the vessel walls.

DESCRIPTION OF THE PREFERRED EMBODIMENTS

Further features and other objects and advantages of this invention will become clear from reading the following detailed description with reference to the drawings in which.

Figure 1:
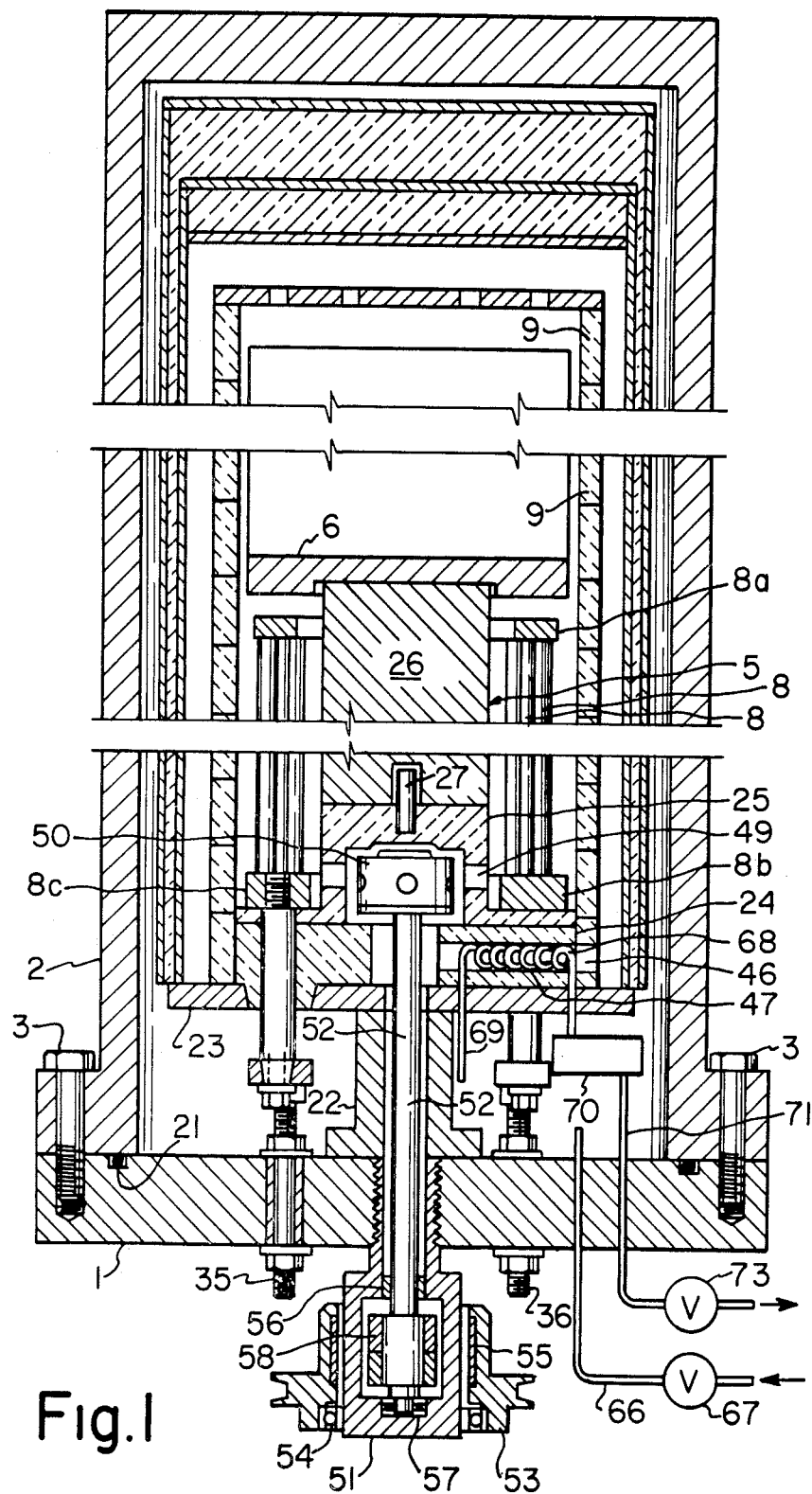
FIG. 1 is a section view through a furnace according to this invention.

Referring to FIG. 1, there is shown a pressure vessel 1, 2 arranged outside of a furnace comprising a hood 4, a shield 9, and heating element 8. A workpiece 7 is supported upon a hearth 6 and pedestal 5.

More specifically, referring to FIG. 1 there is shown a pressure vessel or autoclave comprising a base 1 and an inverted hat-shaped shell 2. The flange at the base of the shell is provided with openings through which fastening means 3 enable the shell to be secured to the base. An O-ring or gasket 21 provides a pressure tight seal. The base or the shell is provided with inlet conduit 66 and valve 67 which are connected to means for pressurizing the interior of the vessel, for example, with an inert atmosphere. Pressures up to 30,000 psi of argon are typical. The thickness of the shell depends upon the pressures to be contained and the diameter of the shell. Typically the shell is made from high strength steel.

Preferably the pedestal 5 comprises a hollow foot 22 supporting a furnace bottom 23 somewhat above the base 1. The foot 22 and the furnace bottom 23 may be constructed of carbon steel. Setting upon the furnace bottom is a heat and electrical insulating support 24 which may be made from refractory insulating or high alumina castable. On top of the support 24 is an impeller chamber 25. The hearth 6 tops the pedestal extension 26. An anchor 27 fixed in the impeller chamber block engages the graphite pedestal extension to ensure alignment.

Surrounding the pedestal but not in contact therewith is an electrical resistance heating element. The heating element may comprise a cylindrical cage of rods 8 with adjacent rods forming pairs joined at the top by caps 8a spanning each pair. Two conducting rings, one 8b with external teeth and another 8c with internal teeth are concentrically arranged around the pedestal to form bases to support the cylindrical rods 8 and to provide pairs of rods with electrical current.

Electrical connecting means 35 and 36 are provided through the base of the vessel to supply an electrical current at an appropriate voltage level to the heating elements.

A refractory shield 9 is provided about the periphery of the heating element. Its principal function is to prevent radiation directly outward from the heating element toward the hood 4.

The shield 9 may comprise an insulating refractory, say a lightweight insulating brick or refractory castable. The shield may also comprise a multi-shell radiation shield. The top and bottom of the shield must be vented. Holes 45 in the top of the shield are preferably centrally spaced. Return holes 46 are circumferentially spaced at the base of the hood.

The insulation support 24 which rests upon the furnace bottom 23 has an axial opening 48 and intake channels 47 extending radially therefrom. Channels 47 are arranged to align with the return holes 46 in shield 9. The impeller chamber block 25 has an impeller chamber with a plurality of radial exhaust ports 49 extending therefrom. An impeller 50 is positioned within the impeller chamber and is secured to a downwardly extending shaft 52. The shaft passes through the insulating support 24, the furnace bottom 23, the foot 22 and the base 1 of the pressure vessel.

The shaft 52 passes into a sealed magnetic drive unit of the type described, for example in U.S. Pat. Nos. 2,996,363 and 4,106,825, assigned to the same assignee as this application.

Secured to the pressure vessel, for example, by threads is a cylindrical drive housing 51. Surrounding the cylindrical housing 51 is a driven sleeve 53 journaled to the housing by bearings 54. The purpose of the drive sleeve is to carry drive magnets 55 which may be cylindrical magnets of the rare earth cobalt type being circumferentially magnetized. Positioned within the housing is a driven shaft assembly, which assembly joins or is the same as the above described impeller shaft 52. The driven shaft assembly is journaled by a bushing 56 and thrust bearing 57. Secured to the driven shaft assembly are driven magnet or magnets 58 which preferably are cylindrical magnets of the rare earth cobalt types.

When the impeller 50 is rotated it draws the furnace atmosphere or gases along the impeller shaft 52 and forces the gases radially outward into the space between the pedestal wall and the shield 9 in the vicinity of the heating elements 8. The gases are heated passing by the heating elements (assuming they are heated at the time) and forced into the space above the hearth 6 where they transfer heat to the workpiece. Thereafter, the gases pass between the shield 9 and the hood 4 returning through the openings 46 in the shield and passages 47 in the insulating support 24 to the vicinity of the drive shaft 52.

The structure heretofore described is substantially that structure described in our co-pending United States Patent Application Ser. No. 806,732, filed June 15, 1977 entitled "Autoclave Furnace with Mechanical Circulation." The improvement according to this invention involves the following structure: The intake channels 47 radially extending are lined with a coiled conduit 68 having an extension 69 extending to another part of the furnace, in this case, to the space between the furnace bottom 23 and the base 1 of the vessel which is cooler than the workspace above the hearth. The coil portion of the conduit comprises a heat exchanger for removing heat from the gases circulated through the coil by the impeller during the cooling of the vessel as described herein. The conduit intakes the vessel atmosphere at the end of the extension 69. The other end of the conduit 68 is in communication with extension 71. There are preferably coiled conduits in each channel 47 which conduits join through communicating extensions to a manifold 70. Exhaust conduit or extension 71 leads from the manifold to the exhaust valve 73 external to the vessel.

The embodiment illustrated in FIG. 1 operates as follows: Heatup is substantially as described above. On cooling, that is after shutoff of energy to the heating element, pressurized gases are drawn into the inlet opening of extensions 69 and through the coils. The impeller is operated to circulate hot furnace gases through the channels 47 to thereby heat the coils. Heat is transferred through the coils to the pressurized gases being passed out of the vessel in the normal process of depressurization. The gases thereby removed are heated to near the temperature of the workspace and/or workpiece thereby increasing the amount of heat removed from the vessel by a given mass of gas.

According to a preferred embodiment, the intake is positioned in a location where the pressurized gases being drawn into the conduit are below the inversion temperature for the Joule-Thomson effect. In this embodiment an irreversible adiabatic expansion takes place in a Joule-Thomson valve or orifice provided between the intake to the conduit and the coil portion of the conduit located in channels 47. As the pressurized gases are forced through the Joule-Thomson valves, the gases are cooled prior to introduction into the coiled portions of the conduits comprising the heat exchanger. Therefore, more heat is required to raise the temperature of the coils and a greater amount of heat per unit mass of exhausting gases is removed from the vessel. It is essential, however, that the gases prior to expansion in the conduit be at a temperature below the inversion temperature characteristic of the pressurized gas. Otherwise, the expansion will result in heating of the gases. Argon is a typical gas used in pressurized vessels for gas pressure bonding and hot isostatic pressing. The inversion temperatures for two useful gases are as follows:

| Gas | °K. | °C. | °F. |
|---|---|---|---|
| Argon | 723 | 450 | 840 |
| Nitrogen | 621 | 350 | 660 |

Helium is not a suitable gas for cooling with the Joule-Thomson effect as its inversion temperature is 51° K (−221° C.).

Obviously, since gases are heated in the coils (coiled portions of the conduits), preferably to the temperature of the workpiece, in order for the Joule-Thomson effect to take place the Joule-Thomson expansion should be substantially complete before the gases reach the coils. In the coils the temperature of the gases may well rise above the inversion temperature. Hence, it is preferable that a throttle valve or orifice be placed at the inlet of each intake to the conduits thus ensuring that the Joule-Thomson expansion takes place prior to the coils.

The gases exhausting from the vessel if not simply released to the atmosphere, must be passed through a heat exchanger or to a reservoir that has the capacity to dissipate the heat carried into the reservoir by the hot vessel exhaust gases.

It is also possible to introduce additional pressurized gases to the vessel that have a temperature near room temperature thus accelerating the cooling process while certainly delaying the pressure letdown. Cooling rates in excess of 60° per minute have been experienced in vessels substantially as described for this embodiment with introduction of pressurized gases. The same vessels with mere air circulation would experience a cooling rate in the order of 20° to 40° C. per minute. Without the circulation by the impeller, the cooling rate would be on the order of 5° to 20° C./min.

Figure 2:
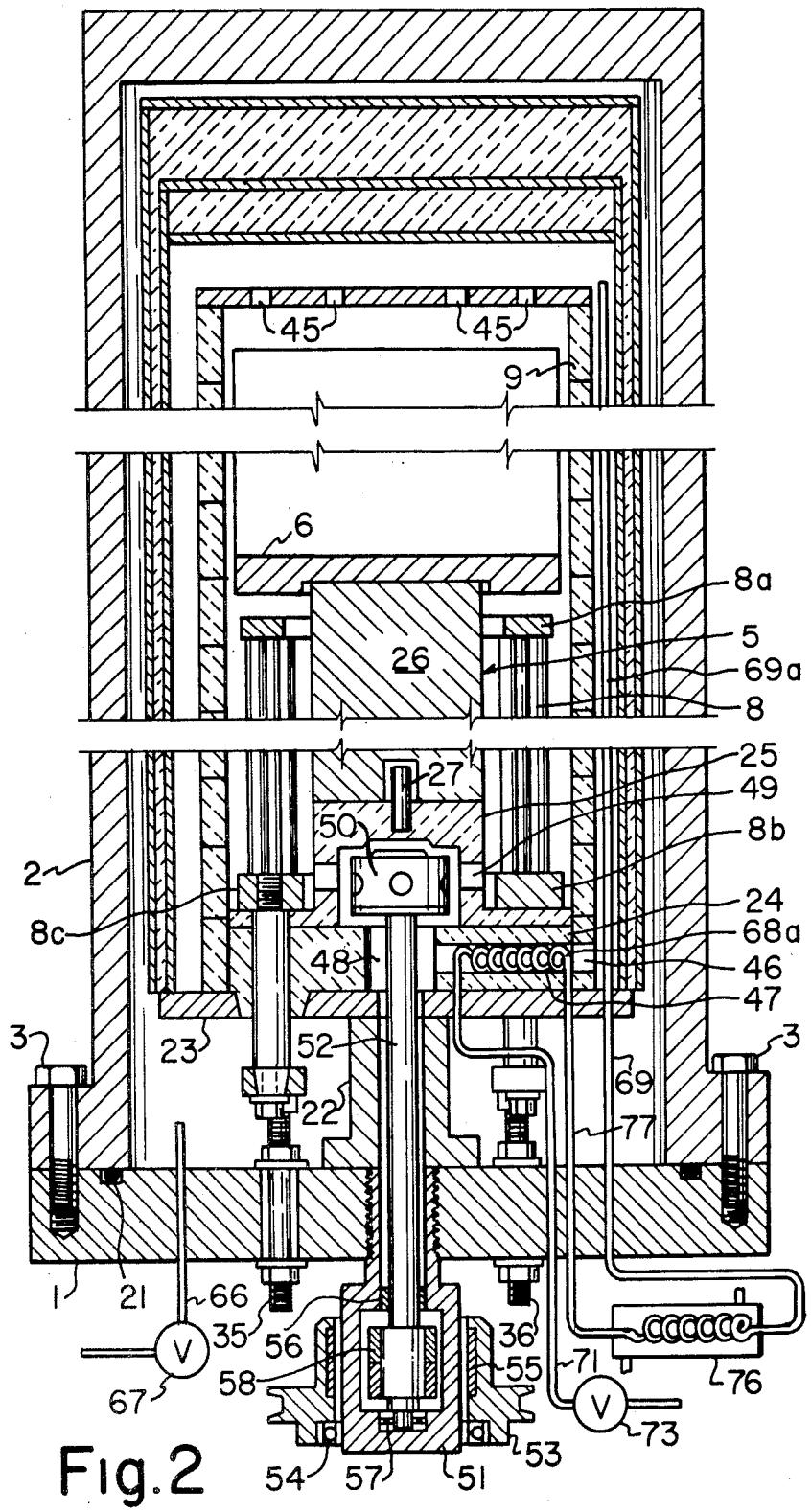
FIG. 2 illustrates a second embodiment of this invention.

It may be that the cooling rates provided by the embodiment described with reference to FIG. 1 are inadequate and/or there exists no location in the vessel at which the temperature is below the inversion temperature for Joule-Thomson cooling. Referring to FIG. 2, there is illustrated an embodiment wherein the conduit 69 leads out of the vessel to a heat exchanger 76 then through conduit 77 back into the vessel were it passes into the coiled conduit 68a located in channels 47. If the Joule-Thomson effect is to be used, the Joule-Thomson valve is placed somewhere between the external heat exchanger 76 and the coiled portion of the conduit. In this way, each unit mass of gas removed from the vessel removes heat, first by transferring heat in the heat exchanger 76 and thereafter by carrying heat out of the vessel during the letdown. In this embodiment, it is not necessary or even perhaps desirable to have the intake of the conduit located in the coolest portion of the furnace. In fact it may be desirable to locate the intake to the conduit in the warmest portion of the furnace. The arrangement of this embodiment may be used even where it is not desired to take advantage of the Joule-Thomson effect. The pressure within the vessel is used to force escaping atmosphere first through the external heat exchanger 76 and then through the internal heat exchanger comprising the coiled conduit and thence to the atmosphere or reservoir. No pumps are required for circulating and cooling the escaping gases.

Figure 3:
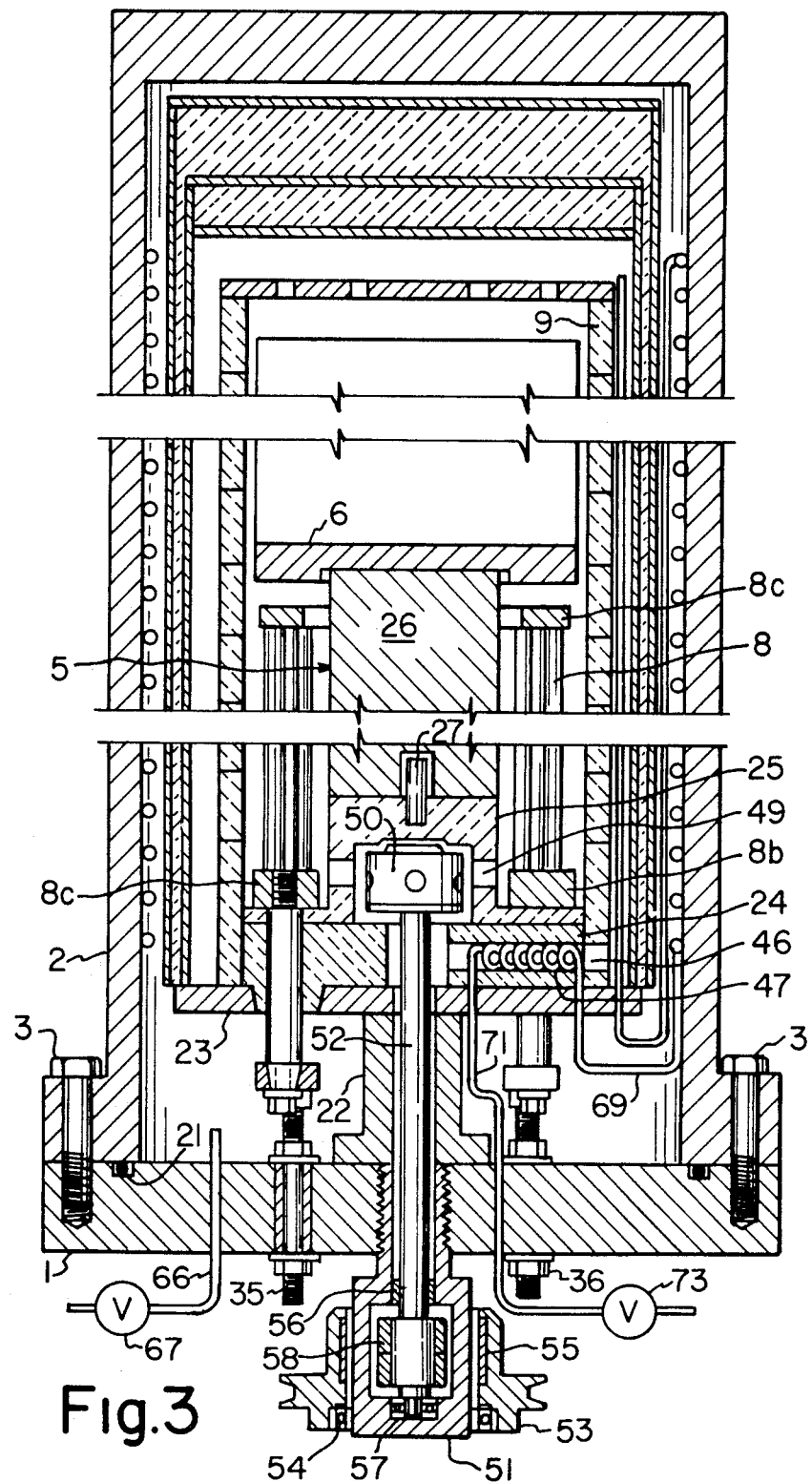
FIG. 3 illustrates the third embodiment of this invention.

A third embodiment of this invention as shown in FIG. 3 is very similar to the embodiment of FIG. 2. The principal difference is that the heat exchanger for cooling the exhausting gases is internal to the vessel. This heat exchanger comprises a conduit coiled around the interior of the pressure vessel wall in close contact therewith.

One design consideration which is necessary in the implementation of this invention is the strength of the conduit beyond the intake and/or the Joule-Thomson valve (which may be one and same). The pressures in the conduit may be substantially less than the vessel pressure and the conduit must be of sufficient thickness to not be crushed by the pressure differential. Of course, the conduit should have a high heat conductivity to make it an efficient heat exchange wall.

Having thus described my invention in the detail and particularity required by the Patent Laws, what is desired protected by Letters Patent is set forth in the following claims.

We claim:

1. An apparatus for gas pressure bonding, hot isostatic pressing or the like in which the workpiece may be treated at elevated temperatures and pressures, said apparatus comprising a cylindrical pressure vessel,
an insulating hood within the vessel for enclosing the workpiece,
a hearth upon which the workpiece rests, and
a heating element within the insulating hood, the improvement comprising
said hearth set upon a pedestal,
said pedestal having an impeller chamber at the base thereof with exhaust ports extending therefrom,
said pedestal set upon an insulating furnace floor cover having intake ports extending therethrough and in communication with said impeller chamber,
an exhaust conduit associated with at least one intake port and coiled along the walls of said intake port,
said conduit having an intake opening at one end within the vessel and passing through the vessel for exhausting the vessel atmosphere,
an impeller in said impeller chamber for circulating furnace atmosphere through said intake ports.

* * * * *